US011956601B2

(12) United States Patent
Allen et al.

(10) Patent No.: US 11,956,601 B2
(45) Date of Patent: Apr. 9, 2024

(54) INTERFEROMETRIC MICROPHONE CALIBRATOR AND COMPARISON CALIBRATING A MICROPHONE

(71) Applicant: Government of the United States of America, as represented by the Secretary of Commerce, Gaithersburg, MD (US)

(72) Inventors: Richard Albert Allen, Clarksburg, MD (US); Randall Paul Wagner, Arlington, VA (US); Qian Dong, Philadelphia, PA (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 17/835,478

(22) Filed: Jun. 8, 2022

(65) Prior Publication Data

US 2022/0394404 A1 Dec. 8, 2022

Related U.S. Application Data

(60) Provisional application No. 63/208,112, filed on Jun. 8, 2021.

(51) Int. Cl.
*H04R 29/00* (2006.01)

(52) U.S. Cl.
CPC .................................. *H04R 29/004* (2013.01)

(58) Field of Classification Search
CPC .................................................... H04R 29/004
See application file for complete search history.

(56) References Cited

U.S. PATENT DOCUMENTS 4,655,086 A * 4/1987 Mielnicka-Pate ........ G01H 3/12 73/648
6,271,923 B1 * 8/2001 Hill .................... G03F 7/70775 356/500

OTHER PUBLICATIONS

Brüel & Kjær, "Technical Review: Danish Primary Laboratory of Acoustics Microphone Reciprocity Calibration Calculation Program for Reciprocity Calibration, No. 1, 1998", Brüel & Kjær Sound & Vibration Measurement A/S, 1998, pp. 1-40 (Year: 1998).*

(Continued)

*Primary Examiner* — Daniel R Sellers
(74) *Attorney, Agent, or Firm* — Office of Chief Counsel for National Institute of Standards and Technology

(57) ABSTRACT

An interferometric microphone calibrator for comparison calibrating a microphone, the interferometric microphone calibrator comprising: an interferometer in optical communication with a microphone and that produces an interferometer measurement light, communicates the interferometer measurement light to the microphone, and receives an interferometer backscattered light from the microphone, such that a sensitivity of a test microphone is interferometrically calibrated to a reference microphone from the interferometer backscattered light; a preamplifier-controller in electrical communication with the microphone, and that receives a driver signal from a microphone driver and drives the microphone driver; the microphone driver in electrical communication with the preamplifier-controller and that receives a driver control signal from a calibration controller and produces the driver signal based on the driver control signal; and a calibration controller in electrical communication with the microphone driver and that produces the driver control signal and communicates the driver control signal to the microphone driver.

19 Claims, 9 Drawing Sheets

(56) References Cited

OTHER PUBLICATIONS

Suh, J-G., et al., "Sensitivity measurement of a laboratory standard microphone by measuring the diaphragm vibration", Applied Acoustics, 2019, p. 38-47, vol. 143.
Barrera-Figueroa, S., et al., "Hybrid method for determining the parameters of condenser microphones from measured membrane velocities and numerical calculations", Journal Acoustical Society of America, 2009, p. 1788-1795, vol. 126 No. 4.
Behler, G., et al., "Reciprocal Measurements on Condenser Microphones for Quality Control and Absolute Calibration", ACTA Acustica United with Acustica, 2004, p. 152-160, vol. 90.
Mills, D.A., et al., "A Novel, High-Frequency, Reciprocal Calibration Method for Dynamic Pressure Sensors Used in High-Speed Flows", AIAA Scitech 2020 Forum, 2020, p. 1-13, DOI: https://doi.org/10.2514/6.2020-2213.
Maclean, W.R., "Absolute Measurement of Sound Without a Primary Standard", Journal of Acoustical Society of America, 1940, p. 140-146, vol. 12.
Cook, R.K., "Absolute pressure calibrations of microphones", Part of Journal of Research of the National Bureau of Standards, 1940, p. 489-505, vol. 25.
Dimattia, A.L., et al.,"On the Absolute Pressure Calibration of Condenser Microphones by the Reciprocity Method", The Journal of Acoustical Society of America, 1946. p. 341-344, vol. 18 No. 2.
Beranek, L.L., et al., "American Standard Method for the Pressure Calibration of Laboratory Standard Microphones Z24.4 1949 (Abridged)", The Journal of Acoustical Society of America, 1950, p. 611-613, vol. 22 No. 5.
American National Standard, "ANSI S1.15-1997/Part 1 (R2016), Measurement Microphones—Part 1: Specifications for Laboratory Standard Microphones", 2016.
American National Standard, "ANSI/ASA S1.15-2021/Part1/ IEC61094-1:2000, IEC 61094-1-Ed. 2.0 2000, Measurement Microphones—Part 1: Specifications for Laboratory Standard Microphones", 2021.
American National Standard, "ANSI S1.15-2005/Part 2 (R2015), Measurement Microphones—Part 2: Primary Method for Pressure Calibration of Laboratory Standard Microphones by the Reciprocity Technique", 2015.
American National Standard, "ANSI/ASA S1.15-2021/Part 2/ IEC 61094-2:2009 (revision of ANSI/ASA S1.15-2005/Part 2 (R2020) Electroacoustics—Measurement microphones—Part 2: Primary method for pressure calibration of laboratory standard microphones by the reciprocity technique", 2021.
International Electrotechnical Commission, "IEC 61094-5 Ed. 2.0 2016-05, Electroacoustics—Measurement Microphones—Part 5: Methods for Pressure Calibration of Working Standard Microphones by Comparison", 2016.
Nedzelnitsky, V., "Laboratory microphone calibration methods at the National Institute of Standards and Technology, U.S.A.", AIP Handbook of Condenser Microphones: Theory, Calibration, and Measurements, edited by G.S.K. Wong and T.F.W. Embleton, 1995, p. 146-161.
Barrera-Figueroa, S., et al., "Hybrid method for determining the parameters of condenser microphones from measured membrane velocities and numerical calculations", Journal of the Acoustical Society of America, 2009, p. 1788-1795, vol. 126 No. 4.
Mills, D.A., et al., "A novel, high-frequency, reciprocal calibration method for dynamic pressure sensors used in high-speed flows", AIAA Scitech 2020 Forum, 2020, p. 2020-2213.
American National Standard, "ANSI/ASA S1.15-2021/Part 6/ IEC 61094-6:2004, Electroacoustics—Measurement microphones—Part 6: Electrostatic actuators for determination of frequency response", 2021.
Wagner, R.P., et al., "New Measurement Service for Determining Pressure Sensitivity of Type LS2aP Microphones by the Reciprocity Method", 2011, p. 761-769, vol. 116 No. 5.
Taylor, B.N., et al., "Guidelines for evaluating and expressing the uncertainty of NIST measurement results", NIST Technical Note 1297-1994 edition, 1994.
Iyer, H.K., et al,. "Consistency tests for key comparison data", Metrologia, 2004, p. 223-230, vol. 41.
Wagner, R.P., et al., "Long-Term stability of one-inch condenser microphones calibrated at the National Institute of Standards and Technology", Journal of Research of the National Institute of Standards and Technology, 2015, p. 164-172, vol. 120.
Bruel & Kjaer, Reciprocity calibration system type 9699 user manual, BE 1499-11, p. 5-30, 1997.
Suh, J.G., et al., "Measurement of resonance frequency and loss factor of a microphone diaphragm using a laser vibrometer", Applied Acoustics, 2010, p. 258-261, vol. 71.
Rasmussen, K., "The static pressure and temperature coefficients of laboratory standard microphones", Metrologia, 1999, p. 265-273, vol. 36 No. 4.
American National Standard, "ANSI/ASA S1.15-2021/Part 8/ IEC 61094-8:2012, Electroacoustics—Measurement microphones—Part 8: Methods for determining the free-field sensitivity of working standard microphones by comparison", 2021.
International Electrotechnical Commission, "IEC 61094-2, Edition 2.1 2022-02 Consolidated Version", 2022.

* cited by examiner

INTERFEROMETRIC MICROPHONE CALIBRATOR AND COMPARISON CALIBRATING A MICROPHONE

CROSS REFERENCE TO RELATED APPLICATIONS

This application claims the benefit of U.S. Provisional Patent Application Ser. No. 63/208,112 (filed Jun. 8, 2021), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is an interferometric microphone calibrator for comparison calibrating a microphone, the interferometric microphone calibrator comprising: an interferometer in optical communication with a microphone and that produces an interferometer measurement light, communicates the interferometer measurement light to the microphone, and receives an interferometer backscattered light from the microphone, such that a sensitivity of a test microphone is interferometrically calibrated to a reference microphone from the interferometer backscattered light; a preamplifier-controller in electrical communication with the microphone, and that receives a driver signal from a microphone driver and drives the microphone driver in a transmission mode based on the driver signal; the microphone driver in electrical communication with the preamplifier-controller and that receives a driver control signal from a calibration controller and produces the driver signal based on the driver control signal; and a calibration controller in electrical communication with the microphone driver and that produces the driver control signal and communicates the driver control signal to the microphone driver.

Disclosed is a process for comparison calibrating a microphone, the process comprising: disposing a reference microphone on a preamplifier-controller, the reference microphone comprising a reference microphone diaphragm; producing an interferometer measurement light by an interferometer; subjecting the reference microphone diaphragm of the reference microphone to the interferometer measurement light by aligning the interferometer measurement light to a first sampling location on the reference microphone diaphragm; subjecting the reference microphone to an electrical waveform from the preamplifier-controller; moving the reference microphone diaphragm according to the electrical waveform; producing, by the reference microphone diaphragm, an acoustic wave comprising an amplitude and frequency from the electrical waveform; determining, by the microphone driver, the drive current through the reference microphone; producing, by the reference microphone diaphragm, interferometer backscattered light in response to the subjecting the reference microphone diaphragm to the interferometer measurement light; receiving the interferometer backscattered light by the interferometer from the reference microphone diaphragm; determining, by the interferometer, the motion of the reference microphone diaphragm from the interferometer backscattered light; repositioning the interferometer measurement light to a different sampling location on the reference microphone diaphragm; determining, by the interferometer, the motion of the reference microphone diaphragm at the different sampling location on the reference microphone from the interferometer backscattered light; terminating the electrical waveform subjected to the reference microphone; determining the pressure sensitivity of the reference microphone from the determinations of the motion of the test microphone diaphragm; removing the reference microphone from the preamplifier-controller and disposing a test microphone on the preamplifier-controller, the test microphone comprising a test microphone diaphragm; performing with the test microphone the following steps: subjecting the test microphone diaphragm of the test microphone to the interferometer measurement light by aligning the interferometer measurement light to the first sampling location on the test microphone diaphragm; subjecting the test microphone to the electrical waveform from the preamplifier-controller; moving the test microphone diaphragm according to the electrical waveform; producing, by the test microphone diaphragm, another acoustic wave comprising the amplitude and frequency from the electrical waveform; determining, by the microphone driver, the drive current through the test microphone; producing, by the test microphone diaphragm, interferometer backscattered light in response to the subjecting the test microphone diaphragm to the interferometer measurement light; receiving the interferometer backscattered light by the interferometer from the test microphone diaphragm; determining, by the interferometer, the motion of the test microphone diaphragm from the interferometer backscattered light from the test microphone diaphragm; repositioning the interferometer measurement light to a different sampling location on the test microphone diaphragm; and determining, by the interferometer, the motion of the test microphone diaphragm at the different sampling location on the test microphone from the interferometer backscattered light; and terminating the electrical waveform subjected to the test microphone; and determining the pressure sensitivity of the test microphone based on determinations of the motion of the test microphone diaphragm, the drive current of the test microphone, and the pressure sensitivity of the reference microphone.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
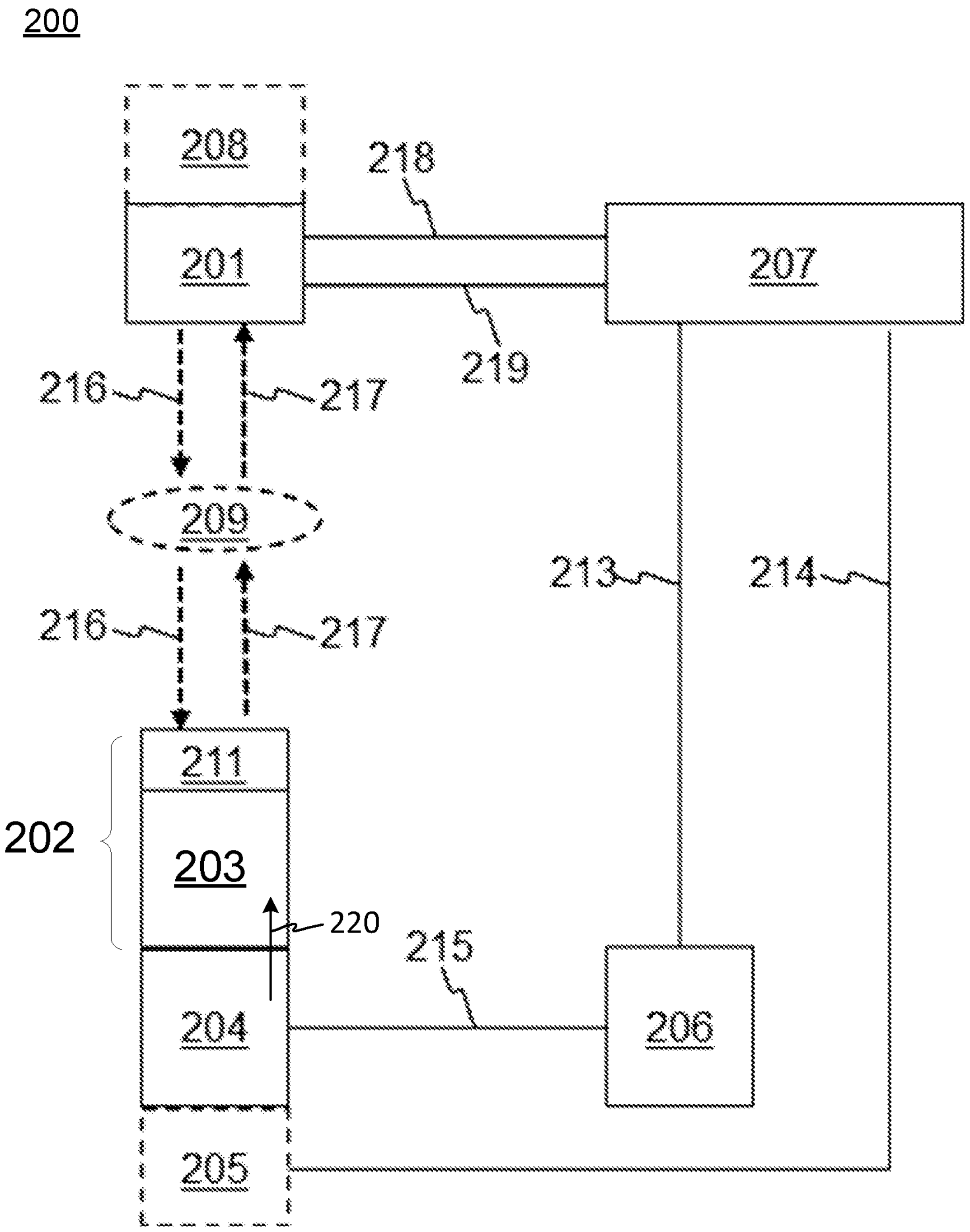
FIG. 1 shows an interferometric microphone calibrator, according to some embodiments.

A detailed description of one or more embodiments is presented herein by way of exemplification and not limitation.

Conventionally, microphones are calibrated to determine their sensitivities for sound pressure measurements and to calibrate other microphones as well as sound calibrators, which apply known sound pressures to calibrate acoustical measurement equipment used in the lab or field. Conventional equipment includes sound level meters, personal sound exposure meters (i.e., noise dosimeters), noise monitoring stations, sound power measurement systems, audiometric equipment, hearing aid test setups, and measuring microphone systems. The sensitivity of a microphone is expressed in SI units of V/Pa or as a sensitivity level in decibels (dB) with respect to a reference of 1 V/Pa.

Conventional primary microphone calibrations, which are carried out without reference to another standard of sound pressure (e.g., a calibrated microphone), are performed using the reciprocity method. For the calibration of laboratory standard microphones, which are designated as type LS1P (nominal 18.6 mm diameter, flat pressure response) or type LS2P (nominal 9.3 mm diameter, flat pressure response) microphones, this method is standardized.

Conventional standardized methods for secondary calibrations of microphones are implemented by simultaneously or sequentially exposing a calibrated reference microphone and the test microphone to nominally identical acoustic fields. The ratio of the pressure sensitivities of the two microphones is then assumed to be equal to the ratio of their output voltages. The two microphones must be exposed to identical acoustic fields. The applicable standard describes several mounting arrangements for both microphones to achieve such fields.

At NIST, a reciprocity-based comparison method is used where a calibrated reference microphone serves as a transmitter, electrically driven to produce sound in an acoustic coupler cavity that is sensed by the receiver microphone, which is an uncalibrated test microphone. The sensitivity of the test microphone is determined from drive-to-receive voltage ratio measurements, the reference microphone sensitivity and driving point electrical impedance, and the acoustic transfer impedance of the cavity.

One approach for microphone calibration as an alternative to the reciprocity method involves laser doppler vibrometer (LDV) measurements of the velocity at different points on a microphone diaphragm to determine its volume velocity when acting as a transmitter/source of sound driven with a current through its electrical terminals. This approach utilizes the fact that the magnitude of the pressure sensitivity of a reciprocal transducer is the same regardless of whether it is used as a receiver of sound or a source of sound. The former is expressed in terms of open-circuit output voltage for a given incident sound pressure uniformly distributed across the diaphragm while the latter is expressed in terms of output volume velocity for a given drive current. Both expressions reduce to the same SI base units. These investigations clearly demonstrated the feasibility of implementing primary microphone calibrations with laser-based velocity measurements of diaphragm vibration, but the results obtained were not established to be as accurate as the results typically obtained with the reciprocity method. Along similar lines, a technique that utilizes microscope-mounted laser vibrometers to measure displacements across the diaphragms of piezoelectric MEMS microphones and dynamic pressure sensors during electromechanical actuation has been developed to replace shock-tube measurements as a means for calibrating these piezoelectric devices.

Indeed, need still exist for calibrated microphones. Conventional calibrations are primary or secondary (comparison). Primary calibrations are performed by the conventional reciprocity technique, and secondary calibrations are performed with conventional comparison techniques. These calibration techniques are available in international standards IEC 61094-2 (primary calibrations) and IEC 61094-5 and IEC 61094-8 (both for secondary calibrations), the disclosure of each which is incorporated herein by reference.

Although the conventional standard primary calibration technique, reciprocity, is relatively complex and time-consuming to perform, an alternative may involve using laser-based interferometry. To date, laser-based interferometry has not replaced the standard way. While a laser-based primary calibration method has not succeeded, an interferometric microphone calibrator and process for comparison calibrating a microphone disclosed herein can be used as a secondary calibration that is significantly better than the conventional methods. Further, the interferometric microphone calibrator and process for comparison calibrating a microphone disclosed herein provide a significantly reduced uncertainty over the conventional secondary calibration techniques. In addition, the interferometric microphone calibrator and process for comparison calibrating a microphone disclosed herein are quicker and easier than conventional technology.

It has been discovered that a process for secondary calibration of microphones determines the sensitivity of a test microphone. It should be appreciated that a secondary calibration compares the response of the test microphone being calibrated with a reference microphone that has a known sensitivity and has been calibrated via either a primary or another secondary calibration.

Interferometric microphone calibrator 200 performs comparison calibration of a test microphone to a reference microphone. In an embodiment, with reference to FIG. 1, FIG. 2, FIG. 3, FIG. 4, FIG. 5, and FIG. 6, interferometric microphone calibrator 200 includes: an interferometer 201 in optical communication with a microphone 202 and that produces an interferometer measurement light 216, communicates the interferometer measurement light 216 to the microphone 202, and receives an interferometer backscattered light 217 from the microphone 202, such that a sensitivity of a test microphone 202.2 is interferometrically calibrated to a reference microphone 202.1 from the interferometer backscattered light 217; a preamplifier-controller 204 in electrical communication with the microphone 202, and that receives a driver signal 215 from a microphone driver 206 and drives the microphone driver 206 in a transmission mode based on the driver signal 215; the microphone driver 206 in electrical communication with the preamplifier-controller 204 and that receives a driver control signal 213 from a calibration controller 207 and produces the driver signal 215 based on the driver control signal 213; and a calibration controller 207 in electrical communication with the microphone driver 206 and that produces the driver control signal 213 and communicates the driver control signal 213 to the microphone driver 206.

In an embodiment, interferometric microphone calibrator 200 includes the microphone 202 in optical communication with the interferometer 201 and in electrical communication with the preamplifier-controller 204. It is contemplated that the microphone 202 is either a reference microphone 202.1 or a test microphone 202.2 that is being calibrated based on a comparison against the reference microphone 202.1. In an embodiment, microphone 202 includes a microphone body 203 disposed on the preamplifier-controller 204 and a microphone diaphragm 211. In an embodiment, the sensitivity of the test microphone 202.2 is determined from the sensitivity of the reference microphone 202.1 by the interferometric microphone calibrator 200. Both sensitivities are determined from separate, respective measurement of interferometer backscattered light 217 from the microphone diaphragm 211.2 of the test microphone 202.2 and the interferometer backscattered light 217 from the microphone diaphragm 211.1 of the reference microphone 202.1, disposed as the microphone 202 on preamplifier-controller 204 during such separate, respective measurement.

In an embodiment, preamplifier-controller 204 converts the driver signal 215 from the microphone driver 206 into an electrical waveform 220 that is communicated to the microphone 202, and electronics in the microphone body 203 receive the electrical waveform 220 from the preamplifier-controller 204 and moves the microphone diaphragm 211 according to the electrical waveform 220.

In an embodiment, microphone diaphragm 211 moves according to the electrical waveform 220 to produce an acoustic wave including an amplitude and frequency from the electrical waveform 220, receives the interferometer measurement light 216 from the interferometer 201, and produces the interferometer backscattered light 217 from the interferometer measurement light 216.

In an embodiment, interferometric microphone calibrator 200 includes a base 205 on which the preamplifier-controller 204 is disposed. The base 205 moves the preamplifier-controller 204 and the microphone 202 relative to the interferometer 201 so that the interferometer measurement light 216 is received at different locations on the microphone diaphragm 211 depending the on the position of the microphone 202 relative to the interferometer 201, and the interferometer backscattered light 217 is produced corresponding to a location of the interferometer measurement light 216 on the microphone diaphragm 211. In some embodiments, the base 205 is in electrical communication with the calibration controller 207 and that receives a base control signal 214 from the calibration controller 207 and moves the preamplifier-controller 204 relative to the interferometer 201 based on the base control signal 214.

In an embodiment, calibration controller 207 produces interferometer control signal 218, the driver control signal 213, and the base control signal 214; and communicates the interferometer control signal 218 to the interferometer 201 under which the interferometer 201 is controlled, the driver control signal 213 to the microphone driver 206, and the base control signal 214 to the base 205, such that the calibration controller 207 controls and synchronizes the interferometer 201 and the microphone driver 206. The calibration controller 207 can receive interferometer data 219 from the interferometer 201, and determine the sensitivity of the microphone 202.

In an embodiment, interferometric microphone calibrator 200 includes beam steerer 209 in optical communication with the interferometer 201 and the microphone 202, optically interposed between the interferometer 201 and the microphone 202, such that the interferometer 201 receives the interferometer measurement light 216 from the interferometer 201 and selectively directs the interferometer measurement light 216 to a specific location on the microphone diaphragm 211.

In an embodiment, interferometric microphone calibrator 200 includes interferometer mount 208 in mechanical communication with the interferometer 201, such that the interferometer mount 208 mechanically isolates the interferometer 201 from motion of the preamplifier-controller 204 and the microphone 202.

Interferometric microphone calibrator 200 can be made of various elements and components that are microfabricated, wherein interferometer 201 can be an optical instrument for high accuracy measurement of displacement of microphone diaphragm 211. Interferometer 201 can be a vibrometer. It should be appreciated that a vibrometer measures velocity rather than displacement. As such, interferometer 201 measure vibrations of microphone diaphragm 211 via the Doppler effect that occurs when interferometer backscattered light 217 scatters from microphone diaphragm 211. The frequency of interferometer backscattered light 217 is different than interferometer measurement light 216 when microphone diaphragm 211 moves under electrical waveform 220 from preamplifier-controller 204. The interferometer 201 detects the frequency shifts of interferometer backscattered light 217 relative to interferometer measurement light 216. Accordingly, interferometer 201 can include various optical and electronic components to splits interferometer measurement light 216 into an internal reference beam directed onto a photodetector. While interferometer measurement light 216 from interferometer 201 is incident on microphone diaphragm 211, microphone diaphragm 211 produces interferometer backscattered light 217 as microphone diaphragm 211 moves. Depending on the velocity and displacement of microphone diaphragm 211, interferometer backscattered light 217 is changed in frequency and phase relative to interferometer measurement light 216. The characteristics of the motion of microphone diaphragm 211 are included in interferometer backscattered light 217. Superposition of interferometer backscattered light 217 with the reference beam from interferometer measurement light 216 produces a modulated signal that provides a Doppler shift in frequency.

In an embodiment, interferometer 201 is an instrument that uses the interference pattern created when a beam of light has been split and sent along two different paths and recombined. Here, the light source can be a laser, which provides coherent light. According to an embodiment, interferometer 201 uses the Doppler shift to directly measure the velocity of the moving microphone diaphragm 211.

The calibration controller 207 can be in communication with interferometer 201 to receive interferometer data 219 from interferometer 201. The interferometer data 219 can include the modulated signal from which the Doppler shift in frequency can be determined. The calibration controller 207 can include a processor for signal processing and analysis of interferometer data 219 from interferometer 201. Accordingly, calibration controller 207 can determine the vibrational velocity or displacement of microphone diaphragm 211 from interferometer data 219. Control computer 207 can control and synchronize the measurements made by interferometer 201 and microphone driver 206.

Figure 5:
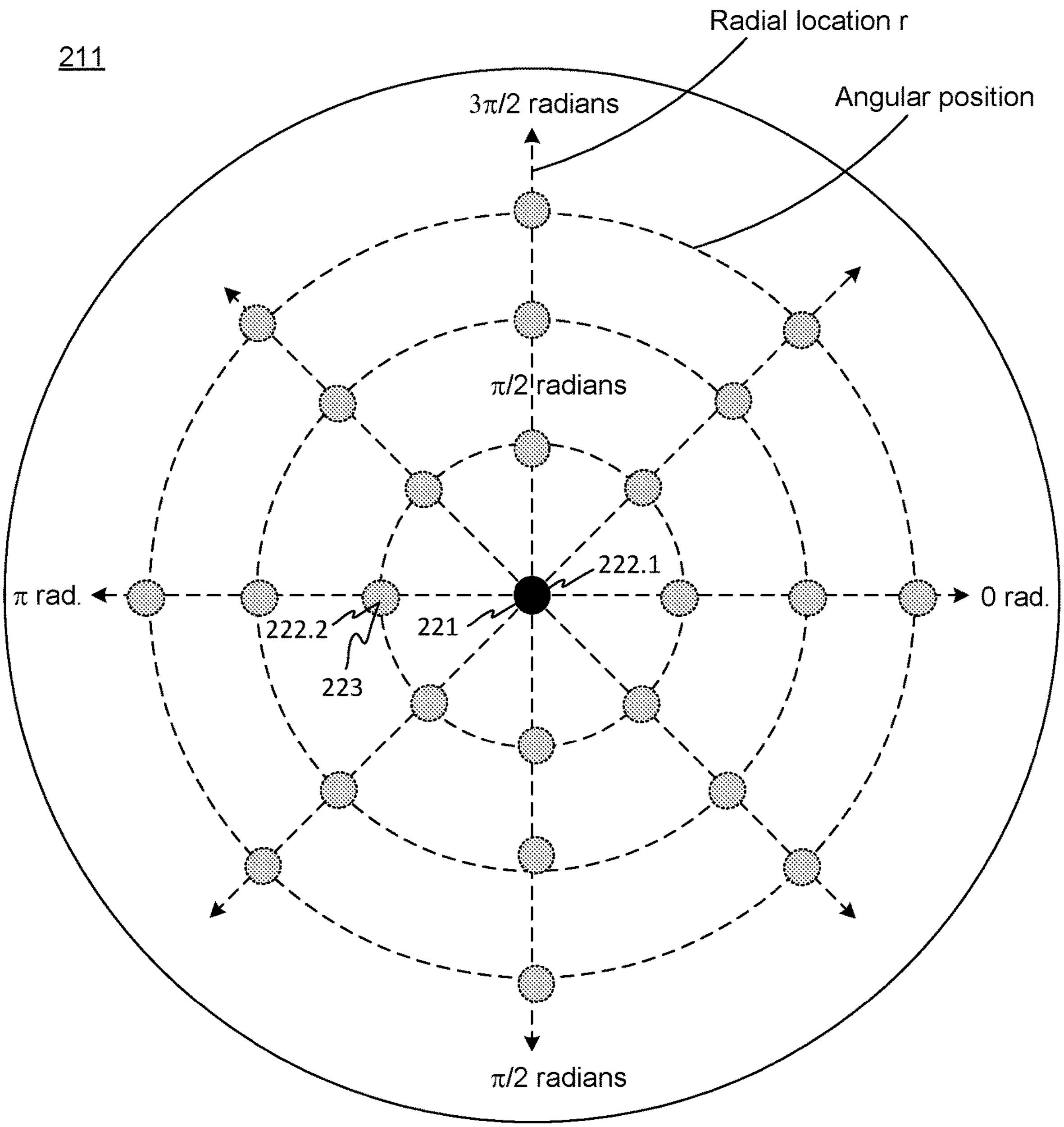
FIG. 5 shows a distribution of sampling locations with respect to the center and a plurality of off-center locations of a microphone diaphragm, according to some embodiments.
Figure 6:
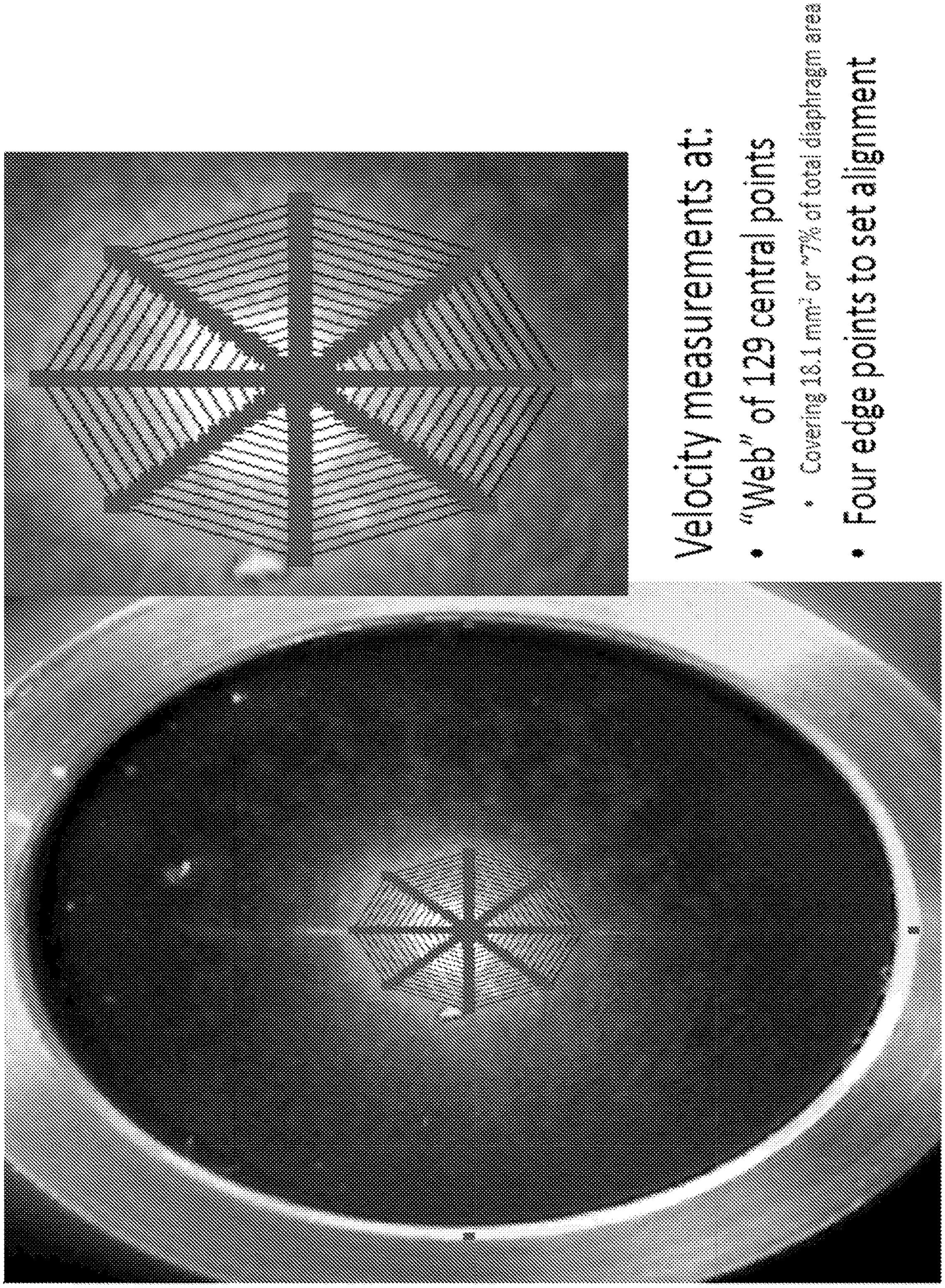
FIG. 6 shows a photograph of a distribution of sampling locations with respect to the center and a plurality of off-center locations of a microphone diaphragm, according to some embodiments.

In some embodiments, interferometer 201 can include a scanning head to direct the laser to a series of specific locations on microphone diaphragm 211, e.g., as shown in FIG. 5 and FIG. 6. The number and position of sampling locations 222 are arbitrary and can be selected based on the radial dimension of the microphone diaphragm 211 or a frequency output by the microphone diaphragm 211. A first sampling location 222.1 can be center 221, and a plurality of different sampling locations 222.2 can include various off-center locations 223. The sequence of probing the sampling locations subjected to interferometer measurement light 216 from interferometer 201 can be arbitrary. In some embodiments, center 221 is initially subjected to interferometer measurement light 216, and subsequently off-center locations 223 are subjected to interferometer measurement light 216. This sequence of sampling can be randomized or permuted.

Figure 2:
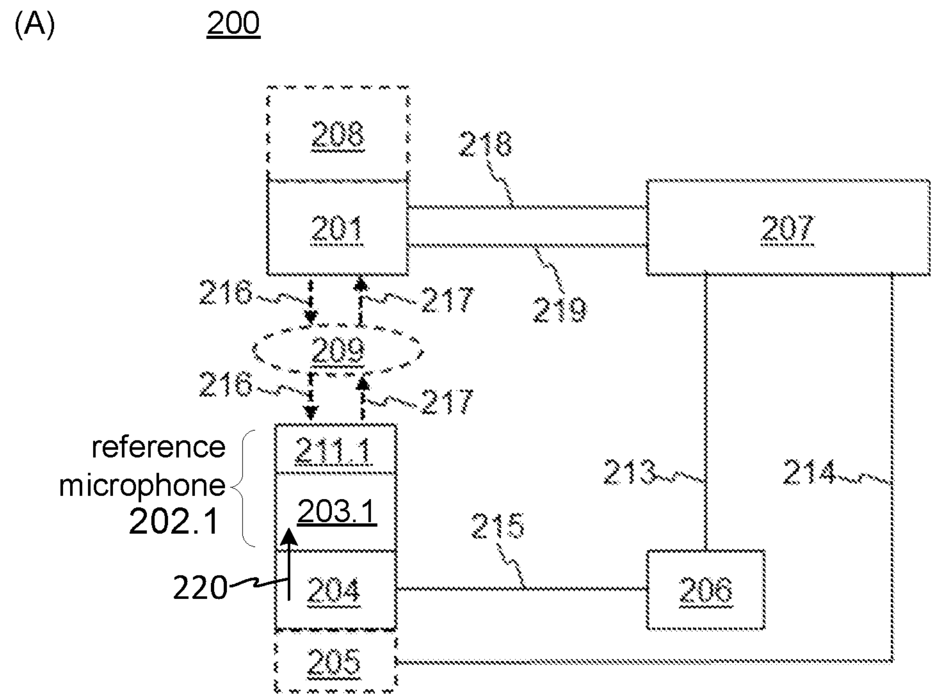
FIG. 2 shows: (a) an interferometric microphone calibrator that in which a reference microphone is disposed on a preamplifier-controller; and (b) the interferometric microphone calibrator in which a test microphone is disposed on the preamplifier-controller, according to some embodiments.
Figure 2:
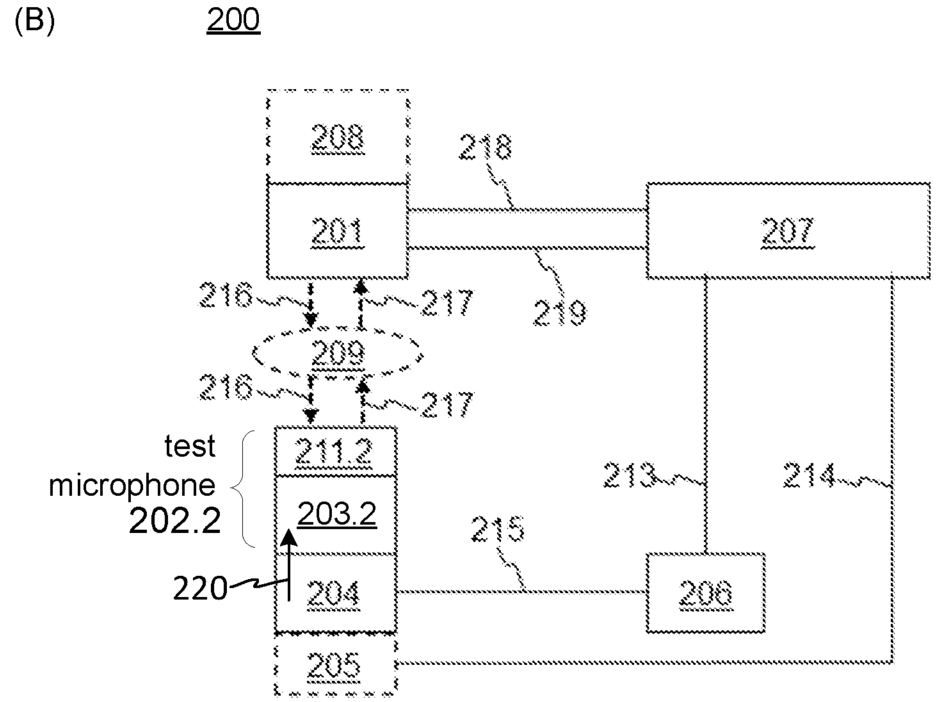

The microphone 202 includes microphone body 203 that houses various electrical components as an electrical interface between preamplifier-controller 204 and microphone diaphragm 211. Motion of the microphone diaphragm 211 is measured by the interferometer 201. With reference to FIG. 2, reference microphone 202.1 (FIG. 2A) of is subjected to interferometer measurement light 216 and produces for interferometer backscattered light 217 to produce a set of calibration data that is used to calibrate test microphone 202.2 (FIG. 2B). Specifically, the motion of reference microphone diaphragm 211.1 of reference microphone 202.1 is measured by interferometer 201 as shown in FIG. 2A, and the motion of test microphone diaphragm 211.2 of test microphone 202.2 is measured by interferometer 201 as shown in FIG. 2. The number of test microphone 202.2 is arbitrary and can be as few as one without an upper limit on calibrations being performed.

Preamplifier 204 is an electrical interface to microphone 202 disposed thereon. It is contemplated that preamplifier 204 can be mounted on base 205. Base 205 provides mechanical (vibration) isolation from the environment and from interferometer 201. Base 205 can include a one- or two-axis translation stage to allow measurements of the motion of multiple locations on the microphone diaphragm 211 of microphone 202 by positioning microphone diaphragm 211 at various locations with respect to interferometer measurement light 216 from interferometer 201. Base 205 can be used to align interferometer measurement light 216 to a specific sampling location 222 on microphone diaphragm 211.

The microphone driver 206 includes electronics for driving microphone 202 and electronically interfaces with preamplifier-controller 204. Driver signal 215 is produced by microphone driver 206 and include data for electrical waveform 220, including a frequency and amplitude information for moving microphone diaphragm 211 of microphone 202. The microphone driver 206 can measure the current driving the microphone 202.

Mount 208 provides mechanical (vibration) isolation of the laser head of interferometer 201 from the environment and from mounting base 205 for the preamplifier 204. In this manner, interferometer measurement light 216 and interferometer backscattered light 217 are communicated with high fidelity with respect to the sampling location 222 on microphone diaphragm 211.

Beam steering optic 209 directs interferometer measurement light 216 from interferometer 201 to multiple sampling locations 222 on the microphone diaphragm 211. Beam steering optic 209 can be used alone or in combination with base 205. Beam steering optic 209 can be a mirror or collection of optical elements that steer interferometer measurement light 216.

Elements of interferometric microphone calibrator 200 can be various sizes. A separation distance between interferometer 201 and microphone diaphragm 211 can be chosen to be suitable for the microphone 202 and measurement conditions with respect to optimizing conditions for transmission and collection of interferometer backscattered light 217 and interferometer measurement light 216.

Elements of interferometric microphone calibrator 200 can be made of a material that is physically or chemically resilient in an environment in which interferometric microphone calibrator 200 is disposed. Exemplary materials include a metal, ceramic, thermoplastic, glass, semiconductor, and the like. The elements of interferometric microphone calibrator 200 can be made of the same or different material and can be monolithic in a single physical body or can be separate members that are physically joined.

Mechanical mounts for interferometer 201, microphone 202, preamplifier 204, and the like can be used. The mechanical mounts can be sufficiently rigid that no vibrations are transmitted between components of interferometric microphone calibrator 200 as well as to isolate the components from any environmental vibration.

Interferometric microphone calibrator 200 can be made in various ways. It should be appreciated that interferometric microphone calibrator 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, interferometric microphone calibrator 200 can be disposed in a terrestrial environment or space environment. Elements of interferometric microphone calibrator 200 can be formed from suitable materials.

In an embodiment, a process for making interferometric microphone calibrator 200 includes: disposing preamplifier 204 on base 205 (e.g., an x-y translation base); disposing interferometer 204 (e.g., a displacement or velocity measuring interferometer, and which can scan) on base 205; aligning interferometer measurement light 216 so that interferometer measurement light 216 impinges orthogonally on microphone diaphragm 211 of microphone 202; interfacing microphone driver 206 sufficient to drive the interferometer 201 and measure the ac drive current, wherein microphone driver 206 optionally can include a microphone preamplifier, a function generator, a dc voltmeter, an ac voltmeter, a DC voltage source for providing a polarization voltage to the microphone; disposing microphone 202 (e.g., reference microphone 202.1 or test microphone 202.1) on and in electrical communication with preamplifier-controller 204.

In an embodiment, a process for making interferometric microphone calibrator 200 includes: disposing preamplifier 204 on base 205; disposing interferometer 201 (vibrometer) on base 205; aligning interferometer measurement light 216 to sampling location 222 so that sampling location 222 impinges on microphone diaphragm 211 of microphone 202 orthogonally; and installing microphone driver 206 and to measure and drive the microphone 202.

In an embodiment, a process for making interferometric microphone calibrator 200 includes: disposing preamplifier 204 on base 205; disposing scanning interferometer 201 on base 205; aligning interferometer measurement light 216 to orthogonally imping on microphone diaphragm 211 of microphone 202; and installing microphone driver 206 and to measure and drive the microphone 202.

In an embodiment, a process for making interferometric microphone calibrator 200 includes disposing preamplifier 204 on base 205; disposing scanning interferometer 201 (vibrometer) on base 205; aligning interferometer measurement light 216 to sampling location 222 so that sampling location 222 impinges on microphone diaphragm 211 of microphone 202 orthogonally; and installing microphone driver 206 and to measure and drive the microphone 202.

Interferometric microphone calibrator 200 has numerous advantageous and unexpected benefits and uses. Interferometric microphone calibrator 200 can be a calibration system or instrument that sequentially measures the velocities of microphone diaphragms 211 of microphones 202 at several sampling location 222 near center 221 of the microphones 202 while the respective microphone 202 is driven as a transmitter (also referred to as a source) of sound through production of an acoustic wave. The velocities of microphone diaphragm 211 are individually measured by interferometry. The interferometry is accomplished by interferometer 201 as displacement or velocity, e.g., via laser-Doppler vibrometry. For measurement at multiple sampling locations 222 on microphone diaphragm 211, beam steering optics 209 (e.g., a mirror) on interferometer 201 or a base 205 on which the microphone 202 and preamplifier-controller 204 are disposed.

Figure 3:
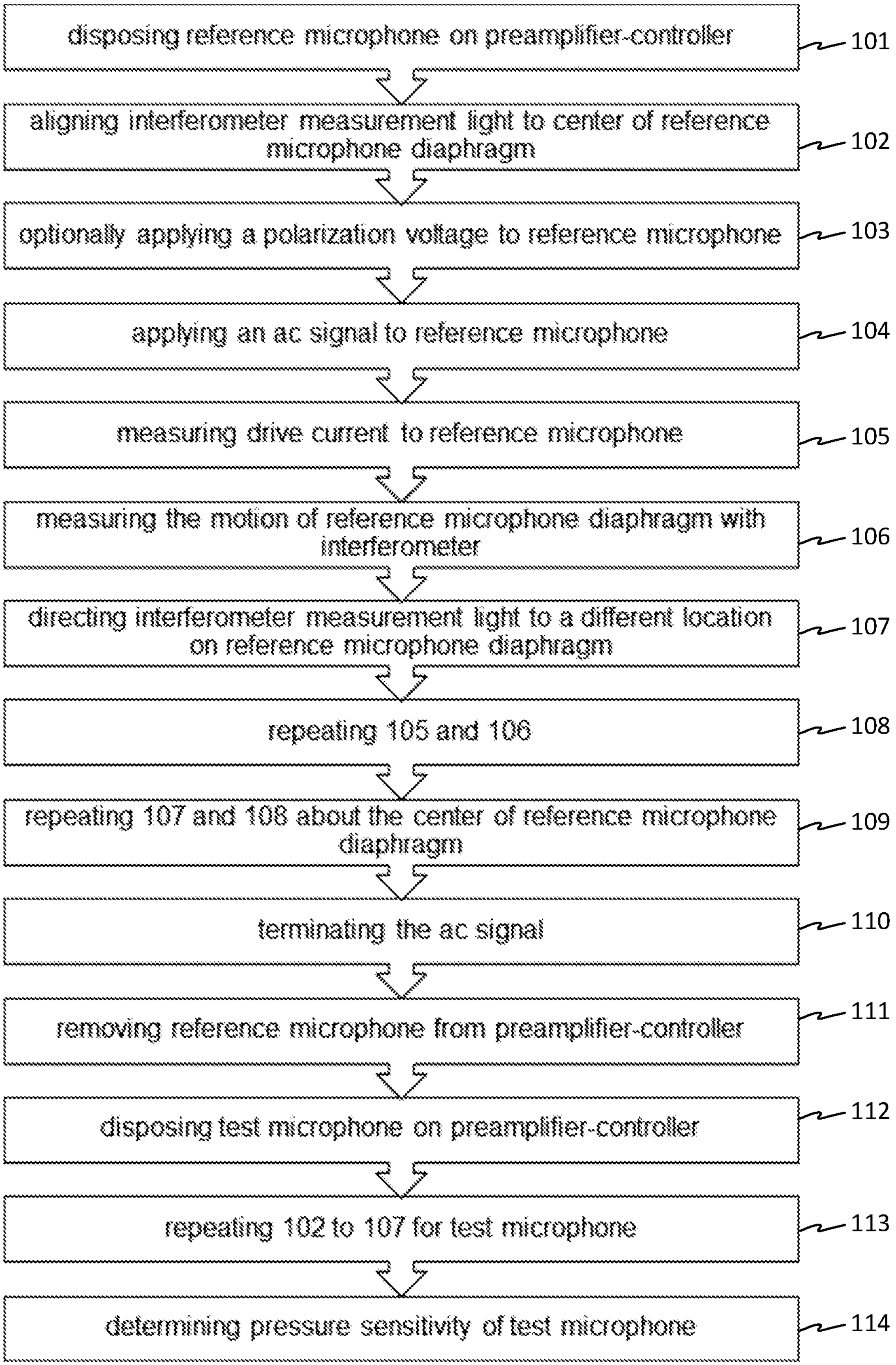
FIG. 3 shows steps involved in comparison calibrating a microphone, according to some embodiments.

In an embodiment, with reference to FIG. 3, a process for comparison calibrating a test microphone against a reference microphone includes: disposing a reference microphone 202.1 on a preamplifier-controller 204, the reference microphone 202.1 comprising a reference microphone diaphragm 211.1; producing an interferometer measurement light 216 by an interferometer 201; subjecting the reference microphone diaphragm 211.1 of the reference microphone 202.1 to the interferometer measurement light 216 by aligning the interferometer measurement light 216 to a first sampling location 222.1 on the reference microphone diaphragm 211.1; subjecting the reference microphone 202.1 to an electrical waveform 220 from the preamplifier-controller 204; moving the reference microphone diaphragm 211.1 according to the electrical waveform 220; producing, by the reference microphone diaphragm 211.1, an acoustic wave comprising an amplitude and frequency from the electrical waveform 220; determining, by the microphone driver 206, the drive current through the reference microphone 202.1; producing, by the reference microphone diaphragm 211.1, interferometer backscattered light 217 in response to the subjecting the reference microphone diaphragm 211.1 to the interferometer measurement light 216; receiving the interferometer backscattered light 217 by the interferometer 201 from the reference microphone diaphragm 211.1; determining, by the interferometer 201, the motion of the reference microphone diaphragm 211.1 from the interferometer backscattered light 217; repositioning the interferometer measurement light 216 to a different sampling location 222.2 on the reference microphone diaphragm 211.1; determining, by the interferometer 201, the motion of the reference microphone diaphragm 211.1 at the different sampling location 222.2 on the reference microphone 202.1 from the interferometer backscattered light 217; terminating the electrical waveform 220 subjected to the reference microphone 202.1; determining the pressure sensitivity of the reference microphone 202.1 from the determinations of the motion of the test microphone diaphragm 211.2; removing the reference microphone 202.1 from the preamplifier-controller 204 and disposing a test microphone 202.2 on the preamplifier-controller 204, the test microphone 202.2 comprising a test microphone diaphragm 211.2; performing with the test microphone 202.2 the following steps: subjecting the test microphone diaphragm 211.2 of the test microphone 202.2 to the interferometer measurement light 216 by aligning the interferometer measurement light 216 to the first sampling location 222.1 on the test microphone diaphragm 211.2; subjecting the test microphone 202.2 to the electrical waveform 220 from the preamplifier-controller 204; moving the test microphone diaphragm 211.2 according to the electrical waveform 220; producing, by the test microphone diaphragm 211.2, another acoustic wave comprising the amplitude and frequency from the electrical waveform 220; determining, by the microphone driver 206, the drive current through the test microphone 202.2; producing, by the test microphone diaphragm 211.2, interferometer backscattered light 217 in response to the subjecting the test microphone diaphragm 211.2 to the interferometer measurement light 216; receiving the interferometer backscattered light 217 by the interferometer 201 from the test microphone diaphragm 211.2; determining, by the interferometer 201, the motion of the test microphone diaphragm 211.2 from the interferometer backscattered light 217 from the test microphone diaphragm 211.2; repositioning the interferometer measurement light 216 to a different sampling location 222.2 on the test microphone diaphragm 211.2; and determining, by the interferometer 201, the motion of the test microphone diaphragm 211.2 at the different sampling location 222.2 on the test microphone 202.2 from the interferometer backscattered light 217; and terminating the electrical waveform 220 subjected to the test microphone 202.2; and determining the pressure sensitivity of the test microphone 202.2 based on determinations of the motion of the test microphone diaphragm 211.2, the drive current of the test microphone 202.2, and the pressure sensitivity of the reference microphone 202.1.

In the process for comparison calibrating a microphone, determining the pressure sensitivity of the test microphone 202.2 is performed according to:

$$|M_T| = \left| M_R \left( \frac{i_R}{i_T} \right) \left( \frac{u(r_0)_T}{u(r_0)_R} \right) k \right|$$

wherein $M_R$ is the (known) pressure sensitivity of reference microphone 202.1; $i_R$ and $i_T$ are the measured drive currents of the reference microphone 202.1 and test microphone 202.2, respectively; and $u(r_0)_T$ and $u(r_0)_R$ are the measured diaphragm motions of the reference microphone 202.1 and test microphone 202.2, respectively, and k is a scale constant that depends on the ratio of the test frequency to the resonance frequency of the microphones. For the test frequency much less than the resonance frequency, k can be taken as equal to one.

In an embodiment, the process for comparison calibrating a microphone can include subjecting the reference microphone 202.1 to a polarization voltage.

In an embodiment, the process for comparison calibrating a microphone can include terminating the polarization voltage subjected to the reference microphone 202.1.

In an embodiment, the process for comparison calibrating a microphone can include measuring an electronic noise of the preamplifier-controller 204 and the microphone driver 206.

In the process for comparison calibrating a microphone, repositioning the interferometer measurement light 216 to the different sampling location 222.2 on the reference microphone diaphragm 211.1 can include moving base 205 on which the preamplifier-controller 204 is disposed or directing the interferometer measurement light 216 to the different sampling location 222.2.

It should be appreciated that various steps in the process for comparison calibrating a microphone can be repeated, e.g., or re-ordered, where appropriate and without frustrating the process.

In an embodiment, a process for comparison calibrating a microphone includes: installing the reference microphone on the preamplifier (step 1); aligning the laser beam to the center of the diaphragm (step 2); applying the desired polarization voltage to the microphone if needed (step 3); measuring the electric noise of the electronic measurement setup (step 4); applying the desired electrical signal (frequency and amplitude) to the microphone (step 5); measuring the drive current using the electronics (step 6); measuring the diaphragm motion using the interferometer/vibrometer (step 7); moving the stage or directing the beam to a new location on the microphone diaphragm (step 8); repeating steps 6 and 7 (step 9); repeating step 8, followed by steps 6 and 7 for as many points as desired (step 10); terminating the applied signal and polarization voltage from the microphone (step 11); replacing the reference microphone on the preamplifier with the microphone under test (step 12); repeating steps 3-11 (step 13); and determining the pressure sensitivity of the microphone under test according to $$|M_T| = \left| M_R \left(\frac{i_R}{i_T}\right) \left(\frac{u(r_0)_T}{u(r_0)_R}\right) k \right|$$

(step 14).

Mounting the reference microphone 202.1 and connecting it to the preamplifier 204 and control electronics 206 can include mechanically isolating it from the environment as well as from the interferometer 201 head. To enable measurement at multiple locations on the microphone diaphragm, the mount can include an x-y translation stage.

In using microphone driver 206 to measure the drive current to the reference microphone 202.1, a calibrated capacitor can be disposed in series with the microphone while measuring the voltage across the capacitor and calculating the current, which is given by the capacitance multiplied by the ac voltage.

Repeated repositioning of interferometer measurement light 216 can occur a sufficient number of times until the desired number of measurements have been taken, e.g., in a symmetrical pattern around center 221 of the microphone diaphragm 211.

Interferometric microphone calibrator 200 and processes disclosed herein have numerous beneficial uses. Interferometric microphone calibrator 200 is applicable to a number of measurements, including low-level vibration detection. Interferometric microphone calibrator 200 and processes disclosed herein provide a significantly reduced uncertainty over conventional secondary techniques. In addition, calibrations would be quicker and easier than following the current methods.

The articles and processes herein are illustrated further by the following Example, which is non-limiting.

Example

A precision laser-based comparison calibration method for laboratory standard microphones is described that uses reference microphones calibrated by the pressure reciprocity method. Electrical drive current and diaphragm velocity are measured while the microphones are driven as transmitters/sources of sound; the diaphragm velocity is measured using scanning laser-doppler vibrometry. Sensitivities determined using this method display very good agreement with those determined directly by reciprocity for seven such test microphones at 250 Hz and 1000 Hz. At these frequencies, the expanded (coverage factor, k=2) uncertainties of this comparison calibration method for these microphones are ±0.05 dB.

Figure 7:
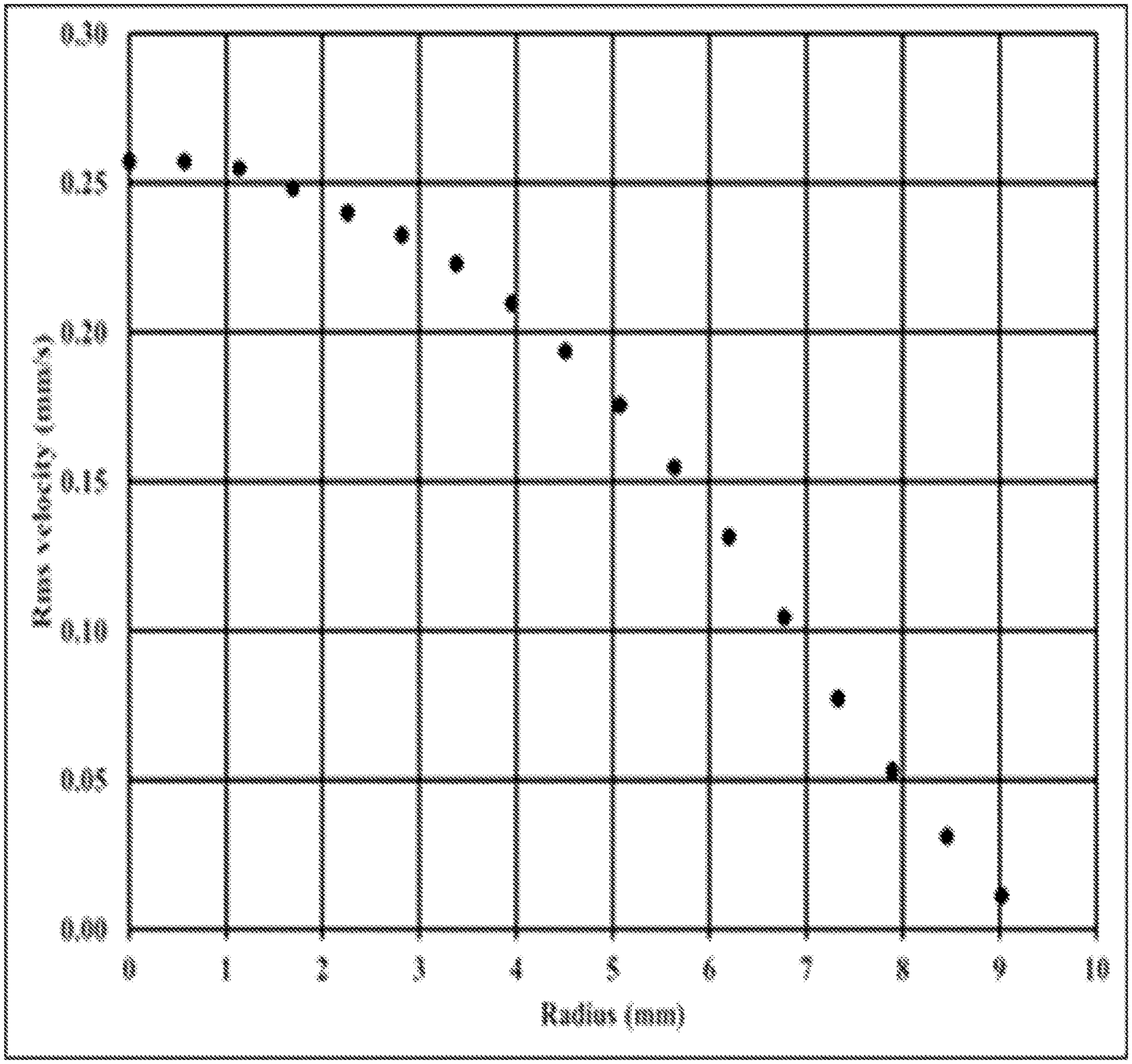
FIG. 7 shows, according to some embodiments, a diaphragm rms velocity (mm/s) profile as a function of the radius (mm) from the diaphragm center for a type LS1P microphone driven with a current of 0.676 μA at a frequency of 1000 Hz. The microphone diaphragm has a radius of 9.3 mm.

In conventional scanning LDV velocity measurements of type LS1P microphones, coarse scans were made across the entire diaphragm of each microphone measured to develop velocity profiles as a function of the radial distance from the center. FIG. 7 shows such a velocity profile for one of the microphones driven with a current of 0.676 μA at a frequency of 1000 Hz. The data with best repeatability was acquired in the central region of the diaphragm where the motion is greatest, as well as being relatively uniform spatially. Based on these observations, a model and equations originally developed for calibration utilizing a single-point measurement at the diaphragm center, without a reference microphone, were applied to develop the precision laser-based comparison calibration method discussed herein that uses a reference LS1P microphone calibrated by reciprocity.

Application of this model therefore led to the acquisition of velocity data with a fine spatial resolution in a relatively small scan area around the diaphragm center to optimize the scanning procedure for the comparison calibration method.

The magnitude of the frequency-dependent pressure sensitivity |M| of a microphone in transmitter mode is expressed as $$|M| = \left| -\frac{q}{i} \frac{Z_a + Z_r}{Z_a} \right| \tag{1}$$

where q is the volume velocity, i is the drive current through the terminals of the microphone, $Z_a$ is the acoustic impedance of the microphone, and $Z_r$ is the radiation impedance of the microphone. For microphones of the same type, the model assumes that the distribution of vibration on the surface of the diaphragm and the volume velocity normalized to the velocity at the center of the diaphragm are consistent from sample to sample in terms of the normalized frequency, which is equal to the drive frequency divided by the resonance frequency of the microphone sample. To apply the model, Eq. 1 is re-written as $$|M| = \left| -\frac{q_n u(r_0)}{i} \frac{Z_a + Z_r}{Z_a} \right| \quad (2)$$

where q is replaced by the product of the normalized volume velocity $q_n$, and the velocity at the diaphragm center $u(r_0)$. Values of $q_n$, derived empirically from LDV velocity measurements across the diaphragms of LS1P microphones driven in transmitter mode, are available as a function of the normalized frequency in the forms of graphical data and tabular data.

For the comparison calibration work described herein, a version of Eq. 2 is applied for a reference (calibrated) microphone with a known pressure sensitivity $M_R$, and another version is applied for a test (uncalibrated) microphone with an unknown pressure sensitivity $M_T$. After dividing the equation for $M_T$ by the one for $M_R$ and solving for $|M_T|$, the equation $$|M_T| = \left| M_R \left(\frac{i_R}{i_T}\right) \left(\frac{u(r_0)_T}{u(r_0)_R}\right) \left(\frac{(q_n)_T}{(q_n)_R}\right) \left( \left(\frac{Z_a + Z_r}{Z_a}\right)_T \Big/ \left(\frac{Z_a + Z_r}{Z_a}\right)_R \right) \right| \quad (3)$$

is obtained, where the subscript T designates a parameter associated with the test microphone and the subscript R designates a parameter associated with the reference microphone. For type LS1P test and reference microphones at relatively low frequencies (1000 Hz and below), the last two terms in the product of Eq. 3, which are the ratio of impedance terms and the ratio of normalized volume velocities, can both be assumed to be equal to one; uncertainties related to these assumptions are included as discussed in the Uncertainty evaluation section. As the measurements discussed herein were conducted at frequencies of 250 Hz and 1000 Hz, the applicable equation reduces to $$|M_T| = \left| M_R \left(\frac{i_R}{i_T}\right) \left(\frac{u(r_0)_T}{u(r_0)_R}\right) \right|. \quad (4)$$

These frequencies were chosen due to their widespread use in specifications for acoustical instrumentation and in sound calibrators, which usually limit their available frequency options to one of or both of these two. Rather than perform an absolute calibration at multiple frequencies, it is often more practical for many acoustical measurement setups to use an absolute calibration performed with a sound calibrator at a single frequency in combination with a microphone frequency response determined by an electrostatic actuator or manufacturer's specifications for frequency response/flatness.

Figure 4:
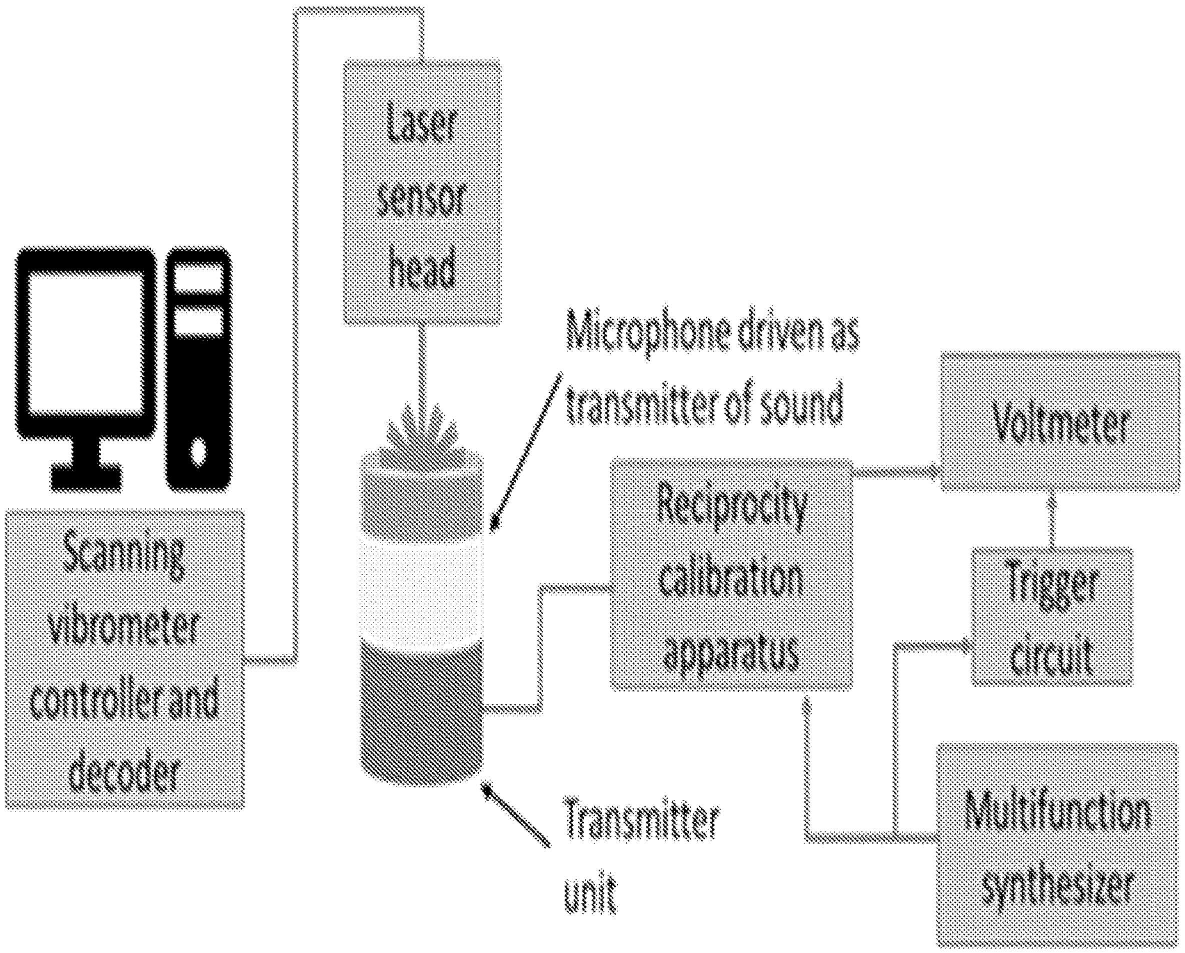
FIG. 4 shows an interferometric microphone calibrator, according to some embodiments.

FIG. 4 shows the configuration of a interferometric microphone calibrator used here. The microphone drive current is produced and determined in a manner similar to that described for reciprocity calibrations done at the National Institute of Standards and Technology (NIST). A multifunction synthesizer supplies a sinusoidal 1.0 V test signal to a Type 5998 reciprocity calibration apparatus (RCA). The RCA amplifies the test signal by 6 dB and directs it to the microphone through a transmitter unit, which contains a calibrated capacitor in series with the microphone. The RCA also provides the microphone with its 200 V polarization voltage. An multimeter configured as an AC voltmeter measures the voltage across the capacitor through an output of the RCA. A trigger circuit synchronized to the test signal from the synthesizer is used to provide a trigger to the voltmeter. After the voltage across the capacitor is measured, the microphone drive current is calculated from the known capacitance. The coherence measured between the synthesizer output and the capacitor voltage at each frequency was effectively unity (value consistently measured either 0.999999 or 1.000000), indicating low noise and a linear relationship between the two voltages.

The microphone diaphragm velocity measurements are made with a scanning vibrometer that includes a vibrometer controller used with a velocity decoder, set to its most sensitive range of 2 (mm/s)/V, a sensor head with a close-up unit, and a junction box. By performing automated measurements while scanning the laser beam over the desired area of the diaphragm, this system acquires velocity data at multiple scan point locations on the diaphragm. At each scan point, the velocity is measured from the decoder signal using Fast Fourier Transform (FFT) signal processing. For a given scan, only the FFT data for the single frequency bin containing the sinusoidal test frequency are utilized, since the microphone is driven during the entire scan at that single frequency.

The velocity was measured in a circular grid of 129 points in the central 7% of the total diaphragm area, e.g., as shown in FIG. 6. The grid consisted of a single center point and 16 rings with eight points each, with 0.15 mm spacing between rings. In addition, there were four diaphragm edge points used only as visual aids to set the alignment.

Nine type LS1P microphones were used to acquire the data to develop the comparison calibration method. Each of these microphones was also calibrated at 250 Hz and 1000 Hz by the reciprocity method using the NIST plane-wave coupler reciprocity calibration system. On a given day, the current and velocity measurements were made at both test frequencies on all microphones sequentially in order to develop a single complete set of data for the microphone group. Seven such data sets containing a trial for each microphone were acquired for the group of nine microphones.

Barometric pressure and temperature data were also acquired during the measurements to ensure that these parameters did not drift outside of allowed limits. For a given day, the ambient barometric pressure is required to stay within a range of 10 mbar. The temperature requirement is 23° C.±2° C.

Two of the nine microphones, the two with the best repeatability in velocity divided by current with all velocity points included, over all trials at 250 Hz, were chosen as reference microphones. At a given frequency, the sensitivity of each test microphone was calculated as the average of the two sensitivities determined using these two reference microphones.

Figure 8:
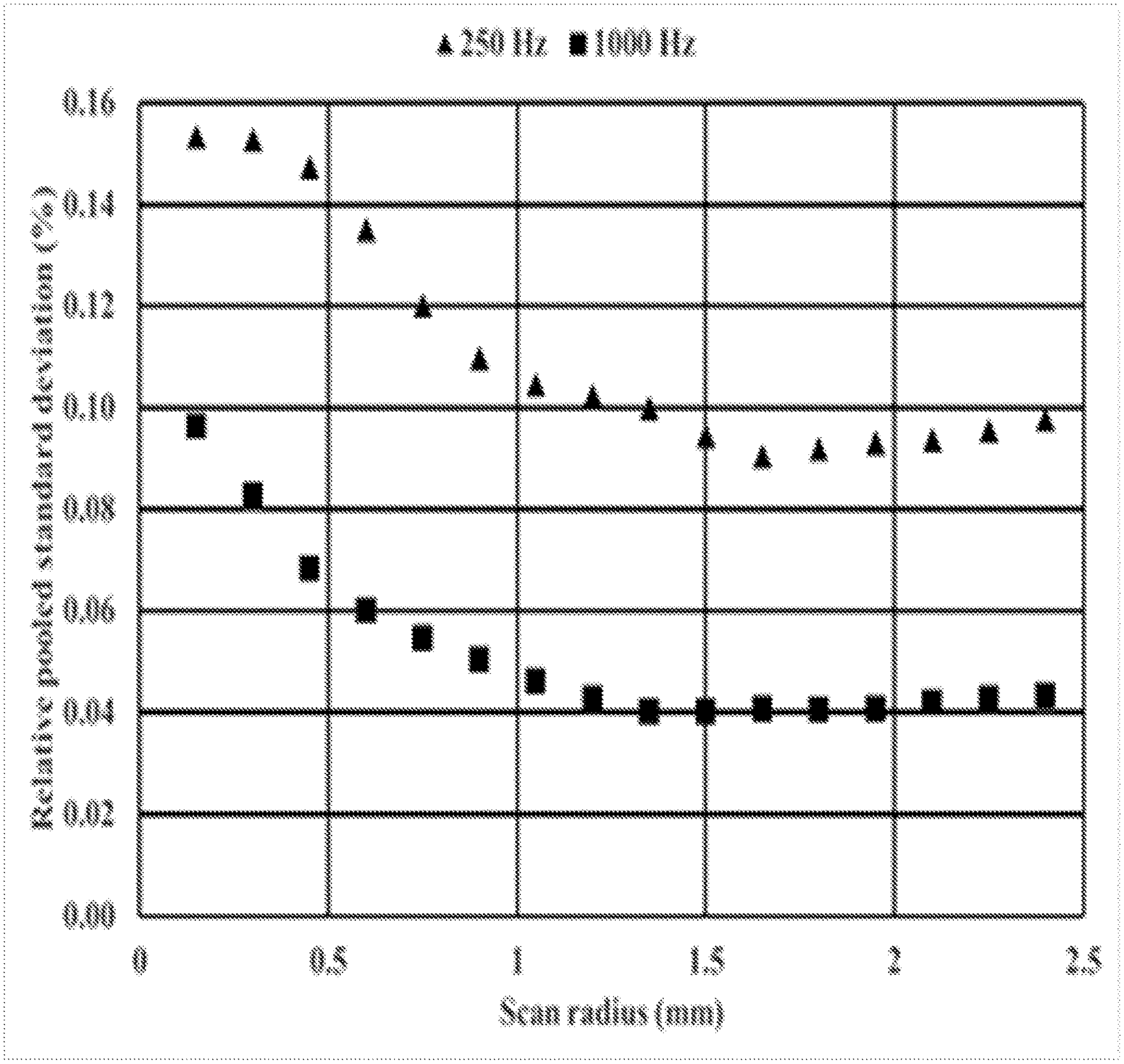
FIG. 8 shows, according to some embodiments, relative pooled standard deviations of the sensitivities measured across all trials for 250 Hz (triangles, ♦) and 1000 Hz (squares, ■) as a function of the radius of the scanned circular center region (i.e., number of rings) of the microphone diaphragms included in the calculations.

For each test microphone and frequency, the variance of the sensitivities measured from all seven comparison calibration trials was calculated. For each frequency, the relative pooled standard deviation was determined from the relative pooled variance calculated by pooling the variances for all seven test microphones. This standard deviation characterizes the repeatability of the comparison calibration method and is a component of the combined standard and expanded uncertainties of the measured sensitivity discussed in the Uncertainty evaluation section. The relative pooled standard deviation of the sensitivities measured across all trials is shown in FIG. 8 for both frequencies as a function of the radius of the circular center region (i.e., number of rings) included in the calculations. Due to the higher velocity signal at 1000 Hz, the repeatability is better at this frequency as compared to 250 Hz for any given radius. For both frequencies, as the radius of the scanned area increases, the relative pooled standard deviation improves until it reaches a minimum at a radius of 1.65 mm (11th ring) for 250 Hz, and a minimum at a radius of 1.50 mm (10th ring) for 1000 Hz. Including the additional data points out to the 16th ring beyond these smaller areas slightly worsens the repeatability. The following results were therefore determined only from data obtained from the points within these smaller scanned areas (3% of the total diaphragm area).

Figure 9:
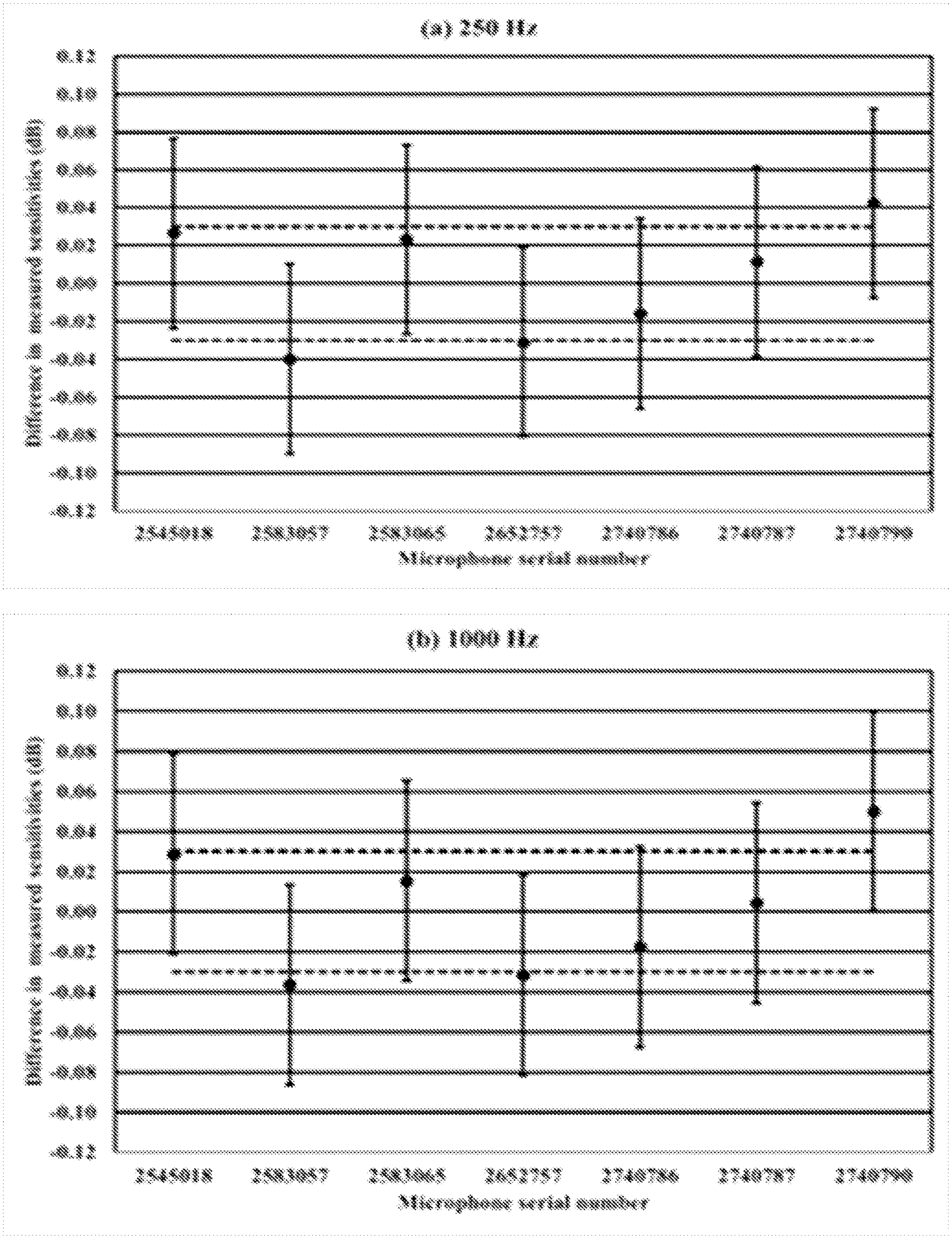
FIG. 9 shows, according to some embodiments, differences between sensitivities of seven test microphones as measured with the laser-based comparison calibration and sensitivities as measured via a reciprocity method for each microphone. (a) 250 Hz. (b) 1000 Hz. A positive value indicates that the sensitivity measured with the comparison method is greater than the sensitivity measured by reciprocity. Uncertainties of reciprocity calibration indicated by dashed lines (- - - -); uncertainties of laser-based comparison calibration indicated by bars (I).

Sensitivities of the seven test microphones as measured with the laser-based comparison calibration method were compared with the sensitivities as measured via the reciprocity method. The differences are shown in FIG. 9*a* for 250 Hz and in FIG. 9*b* for 1000 Hz, where positive values indicate that the sensitivities measured by the comparison method are greater than the sensitivities measured by reciprocity. The expanded (coverage factor k=2) uncertainty U is displayed separately for each method; as bars at each data point for the comparison method (U=±0.05 dB at both frequencies), and as dashed lines symmetric about the zero-difference line for the reciprocity method (U=±0.03 dB at both frequencies). For 250 Hz, the average absolute difference is 0.027 dB and the largest difference is 0.042 dB; for 1000 Hz, these values are 0.026 dB and 0.050 dB, respectively. For both frequencies, the differences indicate very good agreement between the two methods. Two statistical tests were performed to verify the observed agreement. At each frequency, a paired t-test showed that the calculated t-value is less than the critical t-value indicating that the means are not significantly different (with a probability of 95%). In addition, results from the two methods were compared with each other by calculating normalized deviations, an approach utilized for comparing measurement results obtained by laboratories participating in an interlaboratory comparison with the comparison. A normalized deviation is the difference between the values being compared divided by the root-sum-square of their uncertainties. If the absolute value of a normalized deviation is less than unity, the measurement result is considered to be in agreement with the reference value. If the absolute value of a normalized deviation is greater than unity, the difference between the measured result and the reference value is considered to be greater than what would be expected based on the uncertainties of both. At each frequency, all of the normalized deviations were less than unity indicating agreement between the two methods.

Published guidelines for evaluating uncertainties were applied to determine the standard and expanded (k=2) uncertainties for the laser-based comparison calibration results. These uncertainties are reported and summarized in Table 1 for both frequencies. For each frequency, a standard uncertainty is shown for each individual contributing component along with the expanded uncertainty calculated for the measured sensitivities by combining the component standard uncertainties according to these guidelines. In addition, the type designations (A or B) of the component uncertainties are listed.

TABLE 1

Standard and expanded (coverage factor, k = 2) uncertainties of the laser-based comparison calibration sensitivity measurements for 250 Hz and 1000 Hz.

| Symbol: description | Type | 250 Hz | 1000 Hz |
|---|---|---|---|
| Standard Uncertainties (%) | | | |
| $u_{A1}$: repeatability/pooled variance | A | ±0.091 | ±0.040 |
| $u_{A2}$: long-term drift of references | A | ±0.092 | ±0.092 |
| $u_{B1}$: sensitivities of references | B | ±0.173 | ±0.173 |
| $u_{B2}$: velocity ratio | B | ±0.136 | ±0.093 |
| $u_{B3}$: current ratio | B | ±0.046 | ±0.046 |
| $u_{B4}$: normalized volume velocities | B | ±0.052 | ±0.073 |
| $u_{B5}$: polarization voltage | B | ±0.001 | ±0.001 |
| $u_{B6}$: barometric pressure drift | B | ±0.003 | ±0.003 |
| $u_{B7}$: temperature drift | B | ±0.013 | ±0.013 |
| $u_{B8}$: ratio of impedance terms | B | ±0.000 | ±0.001 |
| Expanded (k = 2) Uncertainties (%) | | | |
| U | | ±0.53 | ±0.47 |
| Expanded (k = 2) Uncertainties (dB) | | | |
| U | | ±0.05 | ±0.05 |

A Type A standard uncertainty $u_{A1}$ was determined by calculating the variance of the sensitivities measured for each test microphone over all seven of the trials and pooling the variances obtained for all seven microphones. This standard uncertainty is equal to the standard deviation derived from the pooled variance. It characterizes the repeatability of the comparison calibration method.

An additional Type A standard uncertainty $u_{A2}$ was determined based on the results of a previous statistical analysis of the long-term stability of type LS1P microphones calibrated at NIST. It is included to account for the drift that can occur in the sensitivities of the reference microphones between periodic reciprocity calibrations, which historically have been done routinely at NIST every two years.

A Type B standard uncertainty $u_{B1}$ is included to account for the uncertainty of the reference microphone sensitivity at a given frequency as determined by reciprocity. It is equal to one half of the expanded (k=2) uncertainty of this sensitivity, which was derived in the same manner as previously described for Type LS2aP microphone calibrations done at NIST.

All of the additional standard uncertainties considered to arise from various other effects were determined from Type B evaluations by establishing values for the upper and lower bounds of symmetric rectangular probability distributions based on estimated limits of the effects on the measurement results due to each source of uncertainty. In the absence of any information concerning the shape of the probability distribution, a rectangular distribution is a reasonable default model to assume. The standard deviation of a rectangular probability distribution is equal to one half of the width of the distribution divided by the square root of three. To determine the standard uncertainties for these Type B evaluations, the standard deviations were calculated for each of the rectangular probability distributions developed.

To derive the standard uncertainty $u_{B2}$ of the velocity ratio measured between the test and reference microphones, velocity measurements were performed on three different microphones at four different drive voltages (0.60 V, 0.84 V, 1.0 V, and 1.1 V) measured at the output of the synthesizer to investigate the linearity of the velocity measurements. This range in drive voltages more than covers the range (4 dB) of sensitivities specified for Type LS1P microphones at the two frequencies used. For all three microphones, the various velocity ratios calculated for a given microphone from the velocities measured for the microphone at the different drive voltages were calculated and compared to the values expected based on the ratios of the measured drive voltages. The largest discrepancy found was used to establish bounds for a symmetric rectangular probability distribution. The same approach was used to develop the standard uncertainty $u_{B3}$ for the current ratio measured between the reference and test microphones by using the voltage data measured across the reference capacitor instead of the velocity data.

The standard uncertainty $u_{B4}$ of the ratio of normalized volume velocities for the test and reference microphones is included to account for potential deviations of this ratio from one. Such deviations could potentially be caused by differences in resonance frequencies from the nominal value of 8200 Hz provided for the Type LS1P microphone samples. Bounds were established for a symmetric rectangular probability distribution based on deviations in values of measured resonance frequencies reported for Type LS1P and Type LS2P microphones from nominal values in combination with values of $q_n$ as a function of normalized frequency available as graphical data and tabular data.

To determine the standard uncertainty $u_{B5}$ associated with the uncertainty of the polarization voltage, bounds were established for a symmetric rectangular probability distribution from the multimeter manufacturer's accuracy specifications for DC voltage measurements and the 1 mV difference allowed in the setting of the voltage.

The standard uncertainties $u_{B6}$ and $u_{B7}$ are included to account for effects due to drift in the ambient barometric pressure and temperature, respectively, that could occur during the course of the comparison calibration between reference microphone and test microphone measurements. Bounds were established for symmetric rectangular probability distributions based on published data regarding the static pressure and temperature coefficients of laboratory standard microphones and allowed drifts in the measured pressure and temperature.

The standard uncertainty $u_{B8}$ of the ratio of impedance terms for the test and reference microphones is included to account for potential deviations in this ratio from one. An analysis of these terms was applied in conjunction with potential deviations in the acoustic impedances of the nine microphones from a value determined using nominal equivalent volume parameters of Type LS1P microphones. These potential deviations were inferred from the results obtained by applying an iterative fitting procedure that was performed during the reduction of reciprocity calibration data for these nine microphones.

A laser-based method for comparison calibrations of microphones has been described in this Example that uses scanning LDV velocity measurements at and near the center (central 3% of the diaphragm area) of the Type LS1P test and reference microphones when the microphones are driven as transmitters with measured drive currents. The sensitivities determined with this comparison method at 250 Hz and 1000 Hz for a group of seven test microphones using two reference microphones calibrated by the reciprocity method were found to be in very good agreement with the sensitivities determined for those test microphones directly by the reciprocity method. For 250 Hz, the largest difference in sensitivities determined by the two methods for any of the microphones is 0.042 dB and the average absolute difference, which was calculated using the difference for all test microphones, is 0.027 dB. For 1000 Hz, the largest difference is 0.050 dB and the average absolute difference is 0.026 dB.

The expanded (k=2) uncertainties for the laser-based comparison method are ±0.05 dB at 250 Hz and 1000 Hz. These uncertainties compare favorably to those of the reciprocity-based comparison calibration service conducted at NIST with a large-volume acoustic coupler, which are ±0.08 dB at 250 Hz and 1000 Hz. In addition, the laser-based method is simpler and faster to implement, especially at 1000 Hz where the coupler is hydrogen-filled for the reciprocity-based comparison service. The expanded (k=2) uncertainties for the laser-based comparison method also compare favorably to those specified (±0.08 dB to ±0.10 dB) for a commercial system that implements the method of the relevant international standard.

Measurements of the resonance frequencies for each individual microphone used were not necessary at 250 Hz and 1000 Hz to obtain the relatively low uncertainties for the laser-based comparison method.

The following are incorporated by reference herein in their entirety.

W. R. MacLean, "Absolute measurement of sound without a primary standard," J. Acoust. Soc. Am. 12 (1), 140-146 (1940).

R. K. Cook, "Absolute pressure calibration of microphones," J. Res. Natl. Bur. Stand. 25 (5), 489-505 (1940).

A. L. DiMattia and F. M Wiener, "On the absolute pressure calibration of condenser microphones by the reciprocity method," J. Acoust. Soc. Am. 18 (2), 341-344 (1946).

L. L. Beranek, R. K. Cook, F. F. Romanow, F. M. Wiener, and B. B. Bauer, "American standard method for the pressure calibration of laboratory standard microphones Z24.4-1949 (abridged)," J. Acoust. Soc. Am. 22 (5), 611-613 (1950).

ANSI S1.15-1997/Part 1 (R2016), Measurement Microphones—Part 1: Specifications for Laboratory Standard Microphones (Acoustical Society of America, Melville, NY, 1997).

IEC 61094-1-Ed. 2.0 2000, Measurement Microphones—Part 1: Specifications for Laboratory Standard Microphones (International Electrotechnical Commission, Geneva, Switzerland, 2000).

ANSI S1.15-2005/Part 2 (R2015), Measurement Microphones—Part 2: Primary Method for Pressure Calibration of Laboratory Standard Microphones by the Reciprocity Technique (Acoustical Society of America, Melville, NY, 2005).

IEC 61094-2 Ed. 2.0 2009-02, Electroacoustics—Measurement microphones—Part 2: Primary method for pressure calibration of laboratory standard microphones by the reciprocity technique (International Electrotechnical Commission, Geneva, Switzerland, 2009).

IEC 61094-5 Ed. 2.0 2016-05, Electroacoustics—Measurement Microphones—Part 5: Methods For Pressure Calibration Of Working Standard Microphones By Comparison (International Electrotechnical Commission, Geneva, Switzerland, 2016).

V. Nedzelnitsky, "Laboratory microphone calibration methods at the National Institute of Standards and Technology, U.S.A." in AIP Handbook of Condenser Microphones: Theory, Calibration, and Measurements, edited by G. S. K. Wong and T. F. W. Embleton (AIP Press, Woodbury, N Y, 1995), pp. 145-161.

G. Behler and M. Vorlander, "Reciprocal measurements on condenser microphones for quality control and absolute calibration," Acta Acustica United with Acustica 90, 152-160 (2004).

S. Barrera-Figueroa, K. Rasmussen and F. Jacobsen, "Hybrid method for determining the parameters of condenser microphones from measured membrane velocities and numerical calculations," Journal of the Acoustical Society of America 126 (4), 1788-1795 (2009).

J G. Suh, W H. Cho, H Y. Kim, Z. Cui, and Y. Suzuki, "Sensitivity measurement of a laboratory standard microphone by measuring the diaphragm vibration," Applied Acoustics 143, 38-47 (2019).

D. A. Mills, T.-A. Chen, S. Horowitz, W. C. Patterson, and M. Sheplak, "A novel, high-frequency, reciprocal calibration method for dynamic pressure sensors used in high-speed flows," AIAA Scitech 2020 Forum, AIAA Paper 2020-2213, Orlando, FL, January 2020.

IEC 61094-6 Ed 1.0 2004-11, Electroacoustics—Measurement microphones—Part 6: Electrostatic actuators for determination of frequency response (International Electrotechnical Commission, Geneva, Switzerland, 2004).

R. P. Wagner, V. Nedzelnitsky and S. E. Fick, "New measurement service for determining pressure sensitivity of Type LS2aP microphones by the reciprocity method," J. Res. Natl. Inst. Stan. Technol. 116 (5), 761-769 (2011).

B. N. Taylor and C. E. Kuyatt, Guidelines for evaluating and expressing the uncertainty of NIST measurement results, NIST Technical Note 1297-1994 edition (U.S. Government Printing Office, Washington D.C., 1994).

H. K. Iyer, C. M. Wang, and D. F. Vecchia, "Consistency tests for key comparison data," Metrologia 41, 223-230 (2004).

R. P. Wagner and W. F. Guthrie, "Long-Term stability of one-inch condenser microphones calibrated at the National Institute of Standards and Technology," J. Res. Natl. Inst. Stan. Technol. 120, 164-172 (2015).

Reciprocity calibration system type 9699 user manual, BE 1499-11, p. 5-30, Bruel & Kjaer, December 1997.

J G. Suh, H Y. Kim and Y. Suzuki, "Measurement of resonance frequency and loss factor of a microphone diaphragm using a laser vibrometer," Applied Acoustics 71, 258-261 (2010).

K. Rasmussen, "The static pressure and temperature coefficients of laboratory standard microphones," Metrologia, 36 (4), 265-273 (1999).

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. An interferometric microphone calibrator for comparison calibrating a test microphone, the interferometric microphone calibrator comprising:

an interferometer in optical communication with the test microphone and a reference microphone and that produces an interferometer measurement light, communicates the interferometer measurement light to the test microphone and the reference microphone, and receives an interferometer backscattered light from the test microphone and the reference microphone, such that a sensitivity of the test microphone is interferometrically calibrated to the reference microphone from the interferometer backscattered light according to:

$$|M_T| = \left| M_R \left( \frac{i_R}{i_T} \right) \left( \frac{u(r_0)_T}{u(r_0)_R} \right) k \right|;$$

a preamplifier-controller in electrical communication with the test microphone, and that receives a driver signal from a microphone driver and drives the microphone driver in a transmission mode based on the driver signal;

the microphone driver in electrical communication with the preamplifier-controller and that receives a driver control signal from a calibration controller and produces the driver signal based on the driver control signal; and a calibration controller in electrical communication with the microphone driver and that produces the driver control signal and communicates the driver control signal to the microphone driver.

2. The interferometric microphone calibrator of claim 1, further comprising the test microphone in optical communication with the interferometer and in electrical communication with the preamplifier-controller.

3. The interferometric microphone calibrator of claim 2, wherein the test microphone comprises a microphone body disposed on the preamplifier-controller and a microphone diaphragm.

4. The interferometric microphone calibrator of claim 3, wherein the preamplifier-controller converts the driver signal from the microphone driver into an electrical waveform that is communicated to the microphone, and electronics in the microphone body receive the electrical waveform from the preamplifier-controller and moves the microphone diaphragm according to the electrical waveform.

5. The interferometric microphone calibrator of claim 4, wherein the microphone diaphragm moves according to the electrical waveform to produce an acoustic wave comprising an amplitude and frequency from the electrical waveform, receives the interferometer measurement light from the interferometer, and produces the interferometer backscattered light from the interferometer measurement light.

6. The interferometric microphone calibrator of claim 1, further comprising a base on which the preamplifier-controller is disposed.

7. The interferometric microphone calibrator of claim 6, wherein the base moves the preamplifier-controller and the test microphone relative to the interferometer so that the interferometer measurement light is received at different locations depending the on the position of the test microphone relative to the interferometer, and the interferometer backscattered light is produced corresponding to a location of the interferometer measurement light on the microphone diaphragm.

8. The interferometric microphone calibrator of claim 7, wherein the base is in electrical communication with the calibration controller and that receives a base control signal from the calibration controller and moves the preamplifier-controller relative to the interferometer based on the base control signal.

9. The interferometric microphone calibrator of claim 7, wherein the calibration controller produces interferometer control signal, the driver control signal, and the base control signal; and communicates the interferometer control signal to the interferometer under which the interferometer is controlled, the driver control signal to the microphone driver, and the base control signal to the base, such that the calibration controller controls and synchronizes the interferometer and the microphone driver.

10. The interferometric microphone calibrator of claim 7, wherein the calibration controller receives interferometer data from the interferometer, and determines the sensitivity of the test microphone.

11. The interferometric microphone calibrator of claim 1, further comprising a beam steerer in optical communication with the interferometer and the test microphone, optically interposed between the interferometer and the test microphone, such that the interferometer receives the interferometer measurement light from the interferometer and selectively directs the interferometer measurement light to a specific location on the microphone diaphragm.

12. The interferometric microphone calibrator of claim 1, further comprising an interferometer mount in mechanical communication with the interferometer, such that the interferometer mount mechanically isolates the interferometer from motion of the preamplifier-controller and the test microphone.

13. The interferometric microphone calibrator of claim 1, wherein the sensitivity of the test microphone is determined from the sensitivity of the reference microphone by the interferometric microphone calibrator, which are both determined from separate, respective measurement of interferometer backscattered light from the microphone diaphragm of the test microphone and the interferometer backscattered light from the microphone diaphragm of the reference microphone, disposed in the interferometric microphone calibrator during such separate respective measurement.

14. A process for comparison calibrating a test microphone, the process comprising:

- disposing a reference microphone on a preamplifier-controller, the reference microphone comprising a reference microphone diaphragm;
- producing an interferometer measurement light by an interferometer;
- subjecting the reference microphone diaphragm of the reference microphone to the interferometer measurement light by aligning the interferometer measurement light to a first sampling location on the reference microphone diaphragm;
- subjecting the reference microphone to an electrical waveform from the preamplifier-controller;
- moving the reference microphone diaphragm according to the electrical waveform;
- producing, by the reference microphone diaphragm, an acoustic wave comprising an amplitude and frequency from the electrical waveform;
- determining, by the microphone driver, the drive current through the reference microphone;
- producing, by the reference microphone diaphragm, interferometer backscattered light in response to the subjecting the reference microphone diaphragm to the interferometer measurement light;
- receiving the interferometer backscattered light by the interferometer from the reference microphone diaphragm;
- determining, by the interferometer, the motion of the reference microphone diaphragm from the interferometer backscattered light;
- repositioning the interferometer measurement light to a different sampling location on the reference microphone diaphragm;
- determining, by the interferometer, the motion of the reference microphone diaphragm at the different sampling location on the reference microphone from the interferometer backscattered light;
- terminating the electrical waveform subjected to the reference microphone;
- determining the pressure sensitivity of the reference microphone from the determinations of the motion of the test microphone diaphragm;
- removing the reference microphone from the preamplifier-controller and disposing a test microphone on the preamplifier-controller, the test microphone comprising a test microphone diaphragm;
- performing with the test microphone the following steps:
  - subjecting the test microphone diaphragm of the test microphone to the interferometer measurement light by aligning the interferometer measurement light to the first sampling location on the test microphone diaphragm;

subjecting the test microphone to the electrical waveform from the preamplifier-controller;

moving the test microphone diaphragm according to the electrical waveform;

producing, by the test microphone diaphragm, another acoustic wave comprising the amplitude and frequency from the electrical waveform;

determining, by the microphone driver, the drive current through the test microphone;

producing, by the test microphone diaphragm, interferometer backscattered light in response to the subjecting the test microphone diaphragm to the interferometer measurement light;

receiving the interferometer backscattered light by the interferometer from the test microphone diaphragm;

determining, by the interferometer, the motion of the test microphone diaphragm from the interferometer backscattered light from the test microphone diaphragm;

repositioning the interferometer measurement light to a different sampling location on the test microphone diaphragm; and determining, by the interferometer, the motion of the test microphone diaphragm at the different sampling location on the test microphone from the interferometer backscattered light; and terminating the electrical waveform subjected to the test microphone; and determining the pressure sensitivity of the test microphone based on determinations of the motion of the test microphone diaphragm, the drive current of the test microphone, and the pressure sensitivity of the reference microphone.

15. The process of claim 14, wherein determining the pressure sensitivity of the test microphone is performed according to:

$$|M_T| = \left| M_R \left( \frac{i_R}{i_T} \right) \left( \frac{u(r_0)_T}{u(r_0)_R} \right) k \right|$$

16. The process of claim 14, further comprising subjecting the reference microphone to a polarization voltage.

17. The process of claim 16, further comprising terminating the polarization voltage subjected to the reference microphone.

18. The process of claim 14, further comprising measuring an electronic noise of the preamplifier-controller and the microphone driver.

19. The process of claim 14, wherein repositioning the interferometer measurement light to the different sampling location on the reference microphone diaphragm comprises:

moving a base on which the preamplifier-controller is disposed or directing the interferometer measurement light to the different sampling location.

* * * * *